(12) United States Patent
Basten et al.

(10) Patent No.: US 7,997,609 B2
(45) Date of Patent: Aug. 16, 2011

(54) AIRBAG PACKET

(75) Inventors: Silvan Basten, Messel (DE); Norbert Sahm, Aschaffenburg (DE); Stefan Hamels, Aschaffenburg (DE)

(73) Assignee: Takata-Petri AG, Aschaffenburg (DE)

( * ) Notice: Subject to any disclaimer, the term of this patent is extended or adjusted under 35 U.S.C. 154(b) by 35 days.

(21) Appl. No.: 12/153,538

(22) Filed: May 20, 2008

(65) Prior Publication Data
US 2008/0290639 A1    Nov. 27, 2008

(30) Foreign Application Priority Data

May 21, 2007  (DE) .................... 20 2007 007 245 U

(51) Int. Cl.
*B60R 21/20* (2006.01)
(52) U.S. Cl. ................... 280/728.3; 280/743.1
(58) Field of Classification Search ............. 280/743.1, 280/728.3
See application file for complete search history.

(56) References Cited

U.S. PATENT DOCUMENTS

| | | | |
|---|---|---|---|
| 6,264,233 B1 | 7/2001 | DeWitt | |
| 7,543,708 B2 * | 6/2009 | Doyle et al. | 206/524.8 |
| 7,549,271 B2 * | 6/2009 | Miwa et al. | 53/436 |
| 2002/0135160 A1 * | 9/2002 | Lorenz | 280/728.1 |
| 2006/0125215 A1 | 6/2006 | Clarke et al. | |
| 2008/0111351 A1 * | 5/2008 | Eckert et al. | 280/728.2 |
| 2008/0247686 A1 | 10/2008 | Phee et al. | |

FOREIGN PATENT DOCUMENTS

| | | |
|---|---|---|
| DE | 198 56 623 A1 | 6/2000 |
| DE | 101 14 208 A1 | 5/2002 |
| DE | 100 61 367 A1 | 6/2002 |
| DE | 699 07 172 T2 | 4/2004 |
| DE | 20 2005 011 878 | 11/2005 |
| DE | 10 2004 023 780 A1 | 6/2006 |
| DE | 20 2006 005 319 | 6/2006 |
| EP | 1 514 745 A1 | 9/2003 |
| WO | WO-2007/024196 A1 | 3/2007 |

OTHER PUBLICATIONS

Chinese Examination Report issued Jan. 8, 2010 received in corresponding Chinese Application No. 200810107955.1, including partial translation.
Office Action in CN Appln No. 200810107955.1 (Translation), dated Sep. 8, 2010.

* cited by examiner

*Primary Examiner* — Faye M. Fleming
(74) *Attorney, Agent, or Firm* — Foley and Lardner LLP

(57) ABSTRACT

An airbag packet includes an airbag that is vacuum packed in a film. The airbag is folded into a deep drawn lower film that is sealed at sealing points to an upper film. The sealing points are sealed at various strengths so that when the airbag is deployed the upper film remains connected to the lower film at one or more sealing points.

7 Claims, 1 Drawing Sheet

AIRBAG PACKET

BACKGROUND

The application generally relates to an airbag that is packed in a film. The application relates more specifically to an airbag that is vacuum packed in a film.

It is known to pack airbags in a folded state in a film and create a vacuum inside the film to increase packing density of the airbag. In particular with passenger airbags, the airbag is folded into a deep drawn lower film and welded to a substantially planar upper film. When the airbag is deployed a portion of the film may tear and fly off in an indiscriminate manner. What is needed is a system or method to prevent the film from tearing off when a packed airbag is deployed.

SUMMARY

One embodiment of the application relates to an airbag packet includes an airbag that is vacuum packed in a film. The airbag is folded into a deep drawn lower film that is sealed at sealing points to an upper film. The sealing points are sealed at various strengths so that when the airbag is deployed the upper film remains connected to the lower film at one or more sealing points.

BRIEF DESCRIPTION OF THE DRAWINGS

The invention is intended to be described in exemplary embodiments with reference to drawings, in which.

DETAILED DESCRIPTION

According to various exemplary embodiments, an airbag packet may include an airbag that is vacuum packed in a film. The airbag may be folded into a lower film sealed to an upper film at a number of sealing points. The lower film may be formed using a deep drawn manufacturing process. The sealing points may be sealed at various strengths so that when the airbag is deployed the upper film remains connected to the lower film at one or more sealing points. According to one exemplary embodiment, one sealing point is stronger on one side than the other sealing points and when the airbag is deployed the stronger sealing point functions as a hinge for folding back the lower film. According to other exemplary embodiments, a plurality of sealing points may be stronger than the other sealing points and when the airbag is deployed the stronger sealing points function as a plurality of hinges for folding back the upper film.

According to an exemplary embodiment, the seal at the one more sealing points at which the upper film remains connected to the lower film when the airbag is deployed, may have a greater width than at the other sealing points. According to another exemplary embodiment, the one or more sealing points at which the upper film remains connected to the lower film when the airbag is deployed may be sealed at a higher temperature than the other sealing points. According to another exemplary embodiment, the one or more sealing points at which the upper film remains connected to the lower film when the airbag is deployed may be sealed at a higher pressure than the other sealing points. According to another exemplary embodiment, the one or more sealing points at which the upper film remains connected to the lower film when the airbag is deployed may be impinged during the sealing for a longer period of time than the other sealing points.

Figure 1:
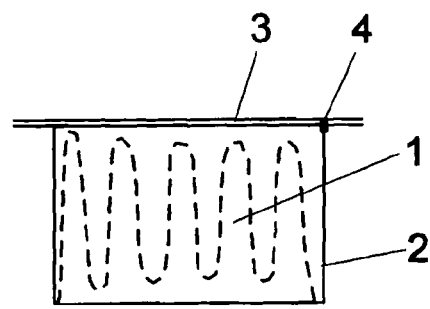
FIG. 1 is a side view of an airbag packed in a film according to an exemplary embodiment.

FIG. 1 shows a schematic representation of a folded airbag 1 that is packed in a deep drawn lower film 2. The lower film 2 is connected and sealed to an upper film 3, closing the lower and upper films 2,3 at a top portion. The folded airbag 1 is located in a space that is formed by the lower film and upper film 2, 3. The space is evacuated of air so that the folded airbag 1 has a greater packing density.

Figure 2:
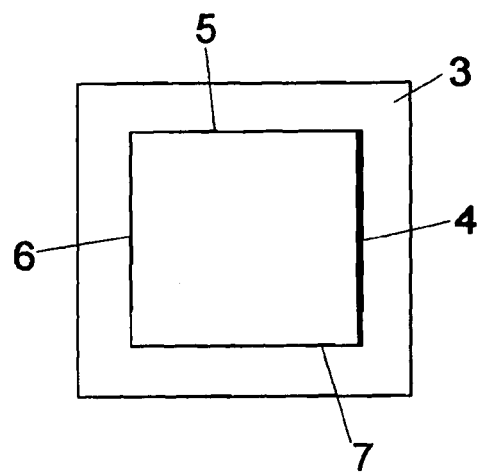
FIG. 2 is a plan view of the arrangement of FIG. 1 according to an exemplary embodiment.
Figure 3:
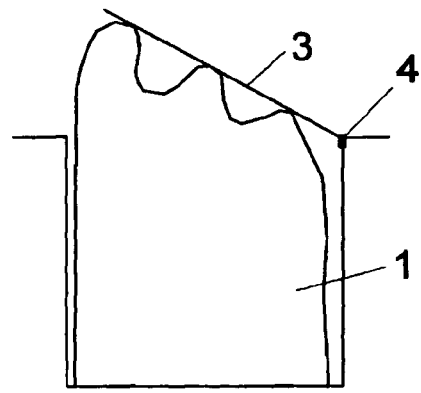
FIG. 3 is a side view of the film packet of FIG. 1 in an open state according to an exemplary embodiment.

As shown in FIG. 2, the sealed packet includes a stronger seal on one side 4 and a weaker seal on three other sides 5, 6 and 7. As shown in FIG. 3 and according to an exemplary tear geometry, the side 4 does not tear when the airbag is deployed, but acts as a hinge while the other sides 5, 6 and 7 tear open.

Figure 4:
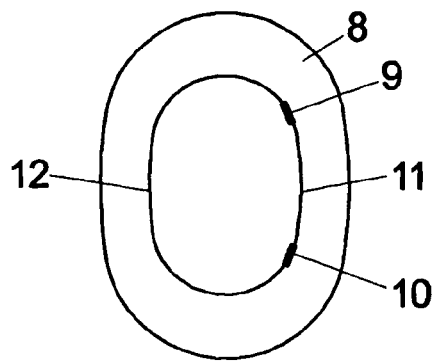
FIG. 4 is a plan view of an airbag packed in a film according to another exemplary embodiment.

In the exemplary embodiment of FIG. 4, an upper film 8 and a lower film (not visible) are connected to one another at two connection points 9, 10 by a strong seal while a point 11 between the points 9, 10 and a curved portion 12 are sealed less strongly. When the airbag is deployed, the points 9, 10 act as hinges while, in particular, the portion 12 tears open and allows generally free deployment of the airbag. The point 11 between the hinges may also tear open. The sealing points may also be configured as extended elongated connection regions between the upper and lower films. The regions of connection may be configured in any suitable geometric shape.

The folded and sealed airbag package or packet may be part of an airbag module. For example, the sealed airbag package may be located in a passenger airbag module that includes an inflator, a housing, and the packet. The module may be mounted in a vehicle instrument panel. The housing and/or instrument panel may include surfaces configured to open or move in a manner corresponding to the upper film 8. Alternatively, the module may include a cover that tears, hinges or deforms allowing the airbag to deploy. In an alternative embodiment, the airbag packet may form part of a module positioned in a vehicle steering wheel. The driver's side module may include an inflator and a housing in addition to the airbag packet. As described above, the module and/or steering wheel may be configured to include a cover that tears, hinges or deforms allowing the airbag to deploy. In other alternative embodiments, the packet may form part of other airbag modules installed in the vehicle such as, for example, a side airbag module, a knee airbag module, or a side curtain module.

Germany Priority Application 20 2007 007 245.7, filed May 21, 2007 including the specification, drawings, claims and abstract, is incorporated herein by reference in its entirety.

Given the disclosure of the application, one versed in the art would appreciate that there may be other embodiments and modifications within the scope and spirit of the application. Accordingly, all modifications attainable by one versed in the art from the present disclosure within the scope and spirit of the present application are to be included as further embodiments of the present application. The scope of the present application is to be defined as set forth in the following claims.

What is claimed is:

1. An airbag packet comprising:
an airbag vacuum packed in a film; and an airbag being folded into a deep drawn lower film that is sealed at sealing points to an upper film,
wherein the sealing points are sealed at various strengths so that when the airbag is deployed the upper film remains connected to the lower film at one or more sealing points.

2. An airbag packet according to claim 1, wherein one of the sealing points on one side is stronger than the other sealing points and functions as a hinge for folding back the upper film when the airbag is deployed.

3. An airbag packet according to claim 1, wherein a plurality of the sealing points are stronger than the other sealing points and function as hinges for folding back the upper film when the airbag is deployed.

4. An airbag packet according to claim 1, wherein the seal of the one or more sealing points at which the upper film remains connected to the lower film when the airbag is deployed have a greater width than the other sealing points.

5. An airbag packet according to claim 1, wherein the one or more sealing points at which the upper film remains connected to the lower film when the airbag is deployed are sealed at a higher temperature than the other sealing points.

6. An airbag packet according to claim 1, wherein the one or more sealing points at which the upper film remains connected to the lower film when the airbag is deployed are sealed at a higher pressure than the other sealing points.

7. An airbag packet according to claim 1, wherein the one or more sealing points at which the upper film is intended to remain connected to the lower film when the airbag is deployed are impinged during sealing for a longer period of time than the other sealing points.

* * * * *